United States Patent Office 3,345,267
Patented Oct. 3, 1967

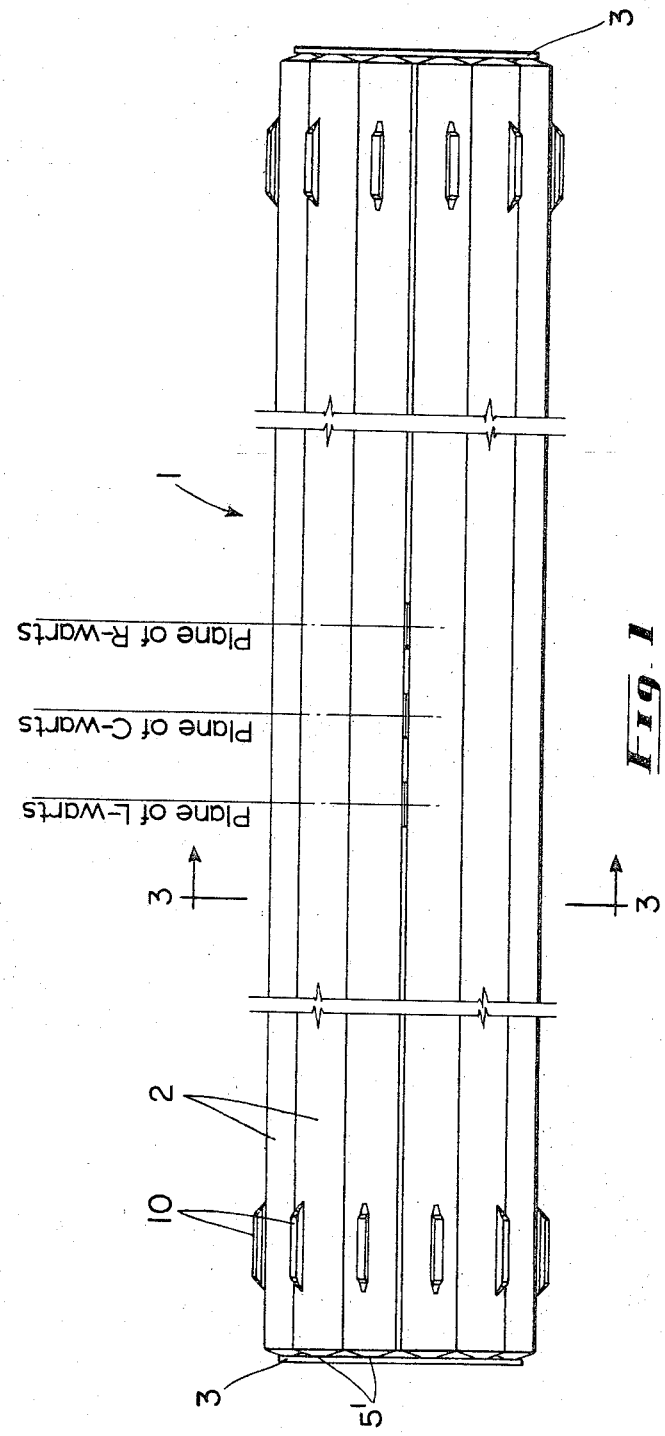

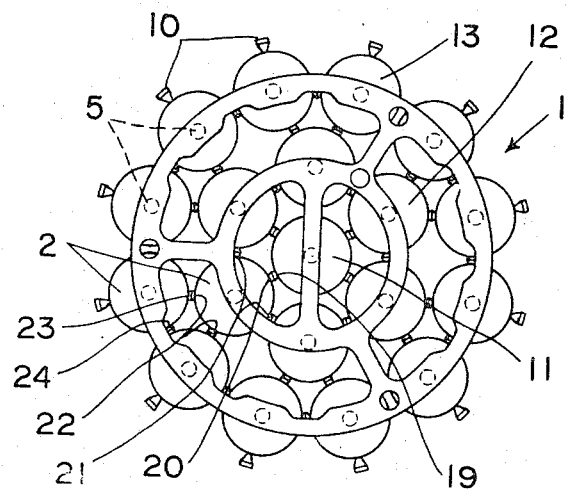
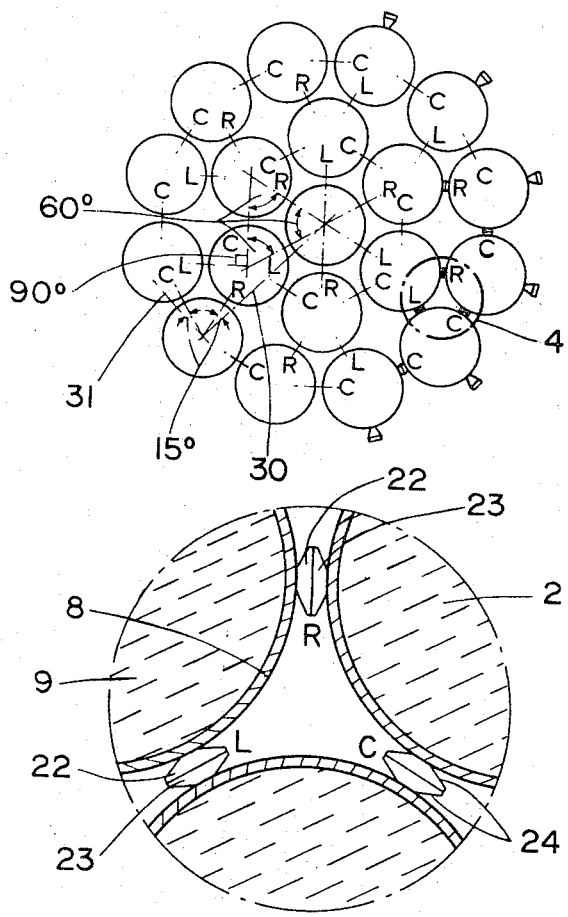

3,345,267
FUEL ROD STRUCTURE
Don B. Nazzer, Box 434, and John Pawliw, Box 184,
both of Peterborough, Ontario, Canada
Filed July 19, 1965, Ser. No. 472,946
Claims priority, application Canada, Aug. 28, 1964,
910,529
8 Claims. (Cl. 176—78)

This invention relates to fuel elements for nuclear reactors and has particular reference to the construction of a fuel bundle for use in such a reactor.

It has been found desirable to construct a fuel bundle for use in a nuclear reactor as a cluster of elements comprising reactive fuel material clad in a metal such as Zircalloy 2 (a zirconium alloy) which serves as a protection for the fuel from the corrosive conditions in which the elements are used and also prevents reactive fission product particles from entering the coolant and being distributed throughout the reactor. It is further very satisfactory for ease and speed of construction to support the elements with respect to one another by end plates or spiders as the sole means of assembly.

While this arrangement is satisfactory initially, there is always a tendency for the fuel to change its shape during operation and for thermal stresses to be set up in the fuel rod. If as a result an element becomes slightly bowed from its straight line shape, the elements will approach or contact one another, and excessive local heating will occur, leading to failure of the cladding material. Since there is differential expansion between elements, and the end plates are somewhat flexible there is also a tendency for the cladding to wear away and puncture by rubbing or fretting at points where two elements contact.

It is an object of the invention to overcome the difficulties experienced in the prior art and in describing an embodiment of the invention, reference will be made to the drawings in which:

FIGURE 1 shows a side view of a fuel element cluster,
FIGURE 2 shows an end view of such a cluster,
FIGURE 3 shows a partly sectional view along line 3—3 of FIGURE 1, and
FIGURE 4 shows an enlarged view of portion 4 of FIGURE 3.

Having reference to FIGURES 1 and 2 the cluster 1 comprises a central element and an inner and an outer ring of fuel elements 2 which are fastened together in the cluster by means of slightly flexible end plates 3. The elements 2 are so shaped at their ends that they are domed and at the peak parts 5' of the domes under areas 5 (FIGURE 2) are brazed, welded, or riveted to the plates 3. The outermost parts of the surfaces of the outer ring of elements carry wear pads 10 which engage the walls (not shown) of the passage of the nuclear reactor into which the fuel cluster is placed.

To prevent the elements of the cluster from contacting one another, warts which comprise metal pieces (preferably Zircalloy 2) are brazed using beryllium (for example) or welded onto the surfaces of the elements in those regions where they will be most deformed and will approach closest to their adjacent elements. Similar warts are placed on the corresponding areas of the adjacent elements so that contact between the claddings of the elements cannot take place and inter-element engagement occurs only on the faces of the warts.

Reference to FIGURE 4 shows the general shape of the warts and the structure of the elements 2. Here the fuel material 9 and the cladding 8 can be seen. The surfaces of the warts may be made slightly cylindrical rather than flat, so that there is line contact between adjacent warts. This leads to lower interfering forces when one wart slides over another and there is less likelihood that the warts will tend to drag each other away from their respective cladding.

Reference to FIGURES 1 and 3 will show that the warts are arranged in different positions depending upon whether the fuel element concerned is the inner element 11, in the inner ring 12, or in the outer ring 13. In FIGURE 1 the warts are shown as arranged in different longitudinal planes and have been designated left, central and right planes by means of the letters L, C and R.

The angular positions of the warts about the axes of their respective elements in this embodiment (in which all elements are cylindrical and of equal length and diameter) are shown by FIGURES 2 and 3 so that each wart 19 on the inner element 11 is separated 60° from its adjacent wart, and the three inwardly directed warts 20 and 21 on each element of the inner ring 12 are separated 60° from one another. The two outer warts 22 of the inner ring 12 are separated 60° from one another, each 90° from its adjacent inner wart. Of the warts on the outer ring of elements, the innermost warts 23 are directed inwardly at an angle offset 15° from the radius 30 drawn from the centre of the cluster to the axis of the outer ring element concerned and each peripheral wart 24 on the outer ring is set inwardly at angle of 15° from the radius 31 at right angles to the radius 30. The planes in which the warts are situated are chosen so that each peripheral wart 24 on the elements of the outer ring 13 and each wart 21 of the inner ring 12 is in the C or central plane. The warts 22 and 23 between inner and outer ring elements are alternately in left, right, right, left planes as seen in FIGURE 3. Finally the six warts 19 on the inner element 11 cooperating with the inner ring elements 20 are alternately in left and right planes as FIGURE 3 again shows.

As a general guide with a cluster of elements some 20 inches long it has been found satisfactory to arrange the plane of the L warts to be about one inch to the left of the C plane and for the plane of the R warts to be about one inch to the right of the C plane.

The advantage of staggering the planes of contact of the warts in this manner is that there is little interference with coolant flow in the axial direction of the element cluster, and the surface over which interacting forces between elements can take place is extended. There is good strength retention in the material of the cladding since disturbances to the structure of the material during the brazing or the welding of the warts are well spread out.

Whilst a specific embodiment of the invention having a central element with 19 elements in the cluster has been described it will be clear that arrangements with different numbers of elements may be constructed. In some cases there may be no single central element but a central cluster with for example three or four elements in the cluster.

The four element structure is particularly suitable for a fuel rod having 28 elements in total. Again while three planes of warts are illustrated here it may sometimes be desirable to have two, four or more planes, or groups of planes along the length of the fuel rod. The cluster of elements need not be of circular array but may be square, hexagonal or of other polygonal shape for instance.

We claim:

1. In a fuel element cluster for use in a nuclear reactor wherein the several elements forming the cluster extend in a longitudinal direction and their surfaces lie adjacent one another, the improvement which comprises, a wart attached to each element of the cluster in a region proximate to an adjacent element and a second wart attached to the adjacent element in said region, contact between the first and said adjacent elements taking place at the surface of said warts, a third wart attached to said first element in a second region proximate to a second adjacent element, a fourth wart attached to said second adjacent element in said second region, contact between said second adjacent element and said first element taking place on the surface of said third and fourth wart, that plane transverse to the longitudinal direction containing said third and fourth warts being spaced longitudinally from the transverse plane containing said first and second warts.

2. A fuel element cluster comprising, an inner longitudinally extending element and a ring of further longitudinally extending elements surrounding said inner element, warts on the surface of said inner element in regions adjacent to each element in said ring, cooperating contacting warts on the surface of each element in said ring in said regions, and further warts on each said element in said ring in second regions proximate to its adjacent elements in said ring, second cooperating contacting warts on each said adjacent element mutually engaging said further warts, the plane transverse to the longitudinal direction, containing the further and second cooperating warts being spaced longitudinally from the plane containing said first mentioned warts and cooperating warts.

3. Apparatus as defined in claim 1, each said wart being convexly faced on its surface engaging its cooperating wart.

4. Apparatus as defined in claim 1 each said wart being cylindrically faced on its surface engaging its cooperating wart, the axis of said cylindrical facing being substantially parallel to said longitudinal direction.

5. A fuel element cluster comprising an inner longitudinally extending element, a first ring of further longitudinally extending elements surrounding said inner element and a second ring of further longitudinally extending elements surrounding said first ring, warts on the surface of said inner element in first regions adjacent to each element in said first ring, second warts on the surface of each element in said first ring cooperating with said first warts, third warts on each said element in said first ring in second regions proximate to its adjacent elements in said first ring, fourth warts on each said adjacent element mutually cooperating with said third warts, fifth warts on each element in said first ring in third regions proximate to its adjacent elements in said second ring, sixth warts on each said element in said second ring cooperating with said fifth warts, seventh warts on each said element in said second ring in fourth regions proximate to its adjacent elements in said second ring and eighth warts on each said element in said second ring cooperating with said seventh warts, the planes containing certain of said warts and their cooperating warts being spaced longitudinally from those planes transverse to the longitudinal direction containing other of said warts and cooperating warts.

6. Apparatus as defined in claim 5 comprising a plurality of sets of said warts and cooperating warts spaced longitudinally of said elements.

7. A fuel element cluster as defined in claim 2, wherein each set of warts on the inner element and their corresponding cooperating warts on the element in said ring are spaced in alternate longitudinal planes, and wherein said further warts and second cooperating warts are in a longitudinal plane intermediate said alternate longitudinal planes.

8. A fuel element cluster as defined in claim 5, the sets of first and second warts being in alternate longitudinal planes, the third and fourth warts being in a plane intermediate said alternate planes, the sets of fifth and sixth warts being alternately in said alternate planes, and the seventh and eighth warts being in the intermediate plane.

References Cited
UNITED STATES PATENTS

| | | | |
|---|---|---|---|
| 3,197,381 | 7/1965 | Blake | 176—78 X |
| 3,211,623 | 10/1965 | Tower | 176—76 X |
| 3,212,991 | 10/1965 | Brynsvold et al. | 176—76 X |
| 3,228,854 | 1/1966 | Bekkering et al. | 176—78 |

FOREIGN PATENTS

| | | |
|---|---|---|
| 655,180 | 1/1963 | Canada. |
| 926,266 | 7/1964 | Great Britain. |

CARL D. QUARFORTH, *Primary Examiner.*

BENJAMIN R. PADGETT, *Examiner.*

M. J. SCOLNICK, *Assistant Examiner.*